Dec. 23, 1958   W. F. BIRD   2,865,046
APPARATUS AND METHOD FOR PRODUCING PATTERNED
FOAM RUBBER COATED FABRICS
Filed July 18, 1956   2 Sheets-Sheet 2
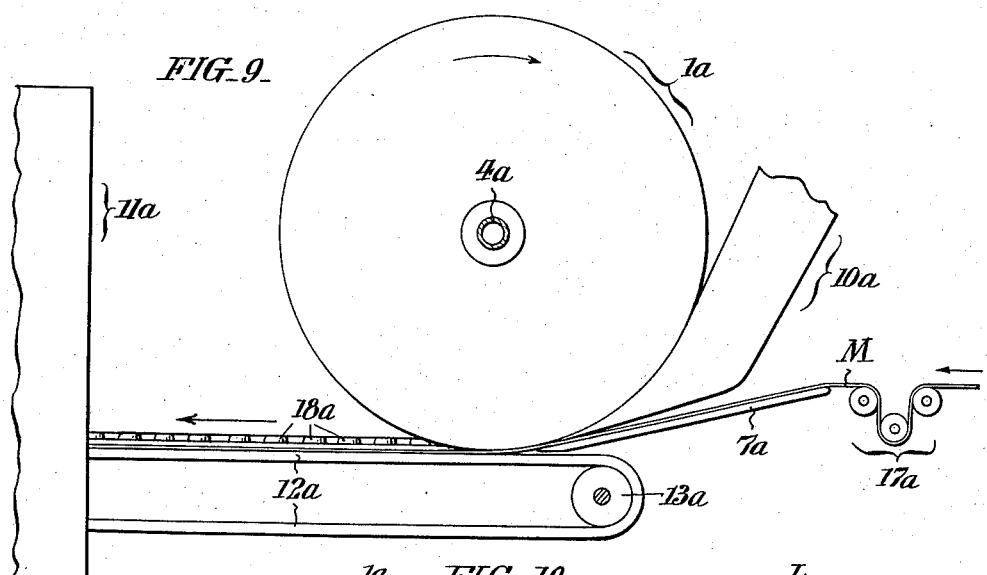
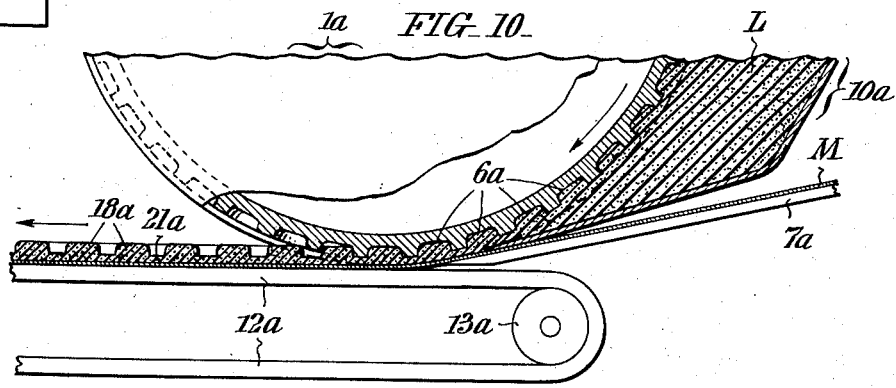
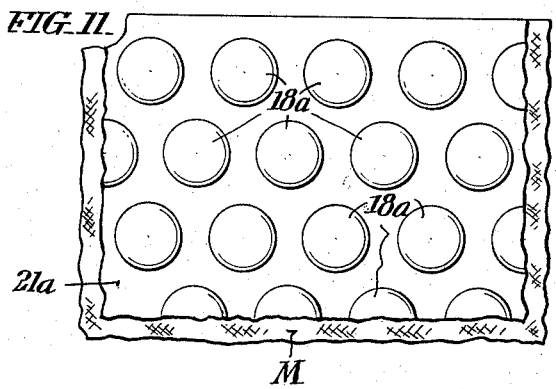
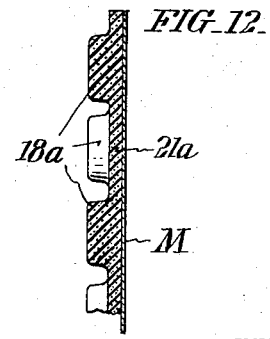
INVENTOR:
Whitworth F. Bird,
BY Paul & Paul
ATTORNEYS

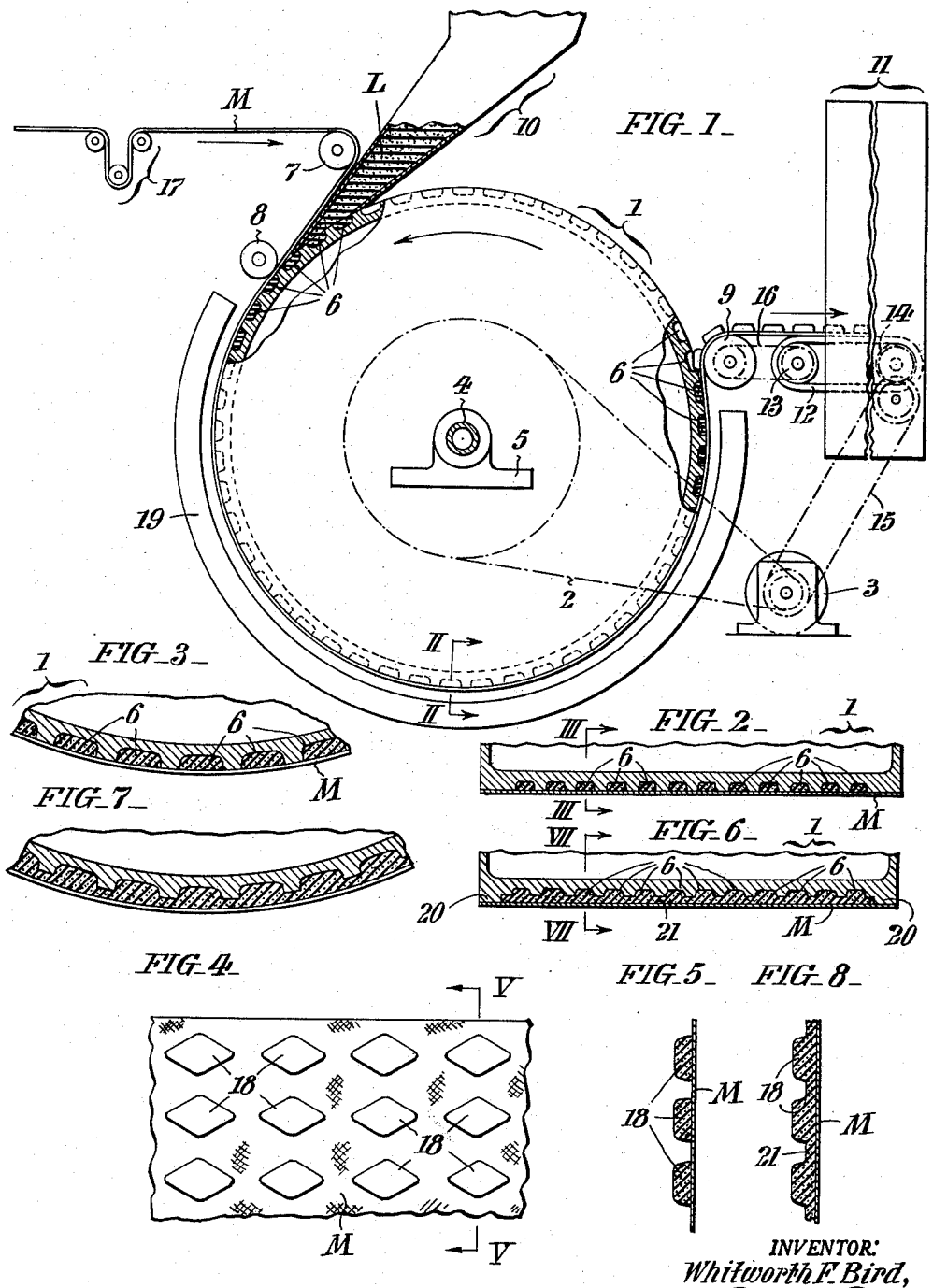

United States Patent Office 2,865,046
Patented Dec. 23, 1958

2,865,046

APPARATUS AND METHOD FOR PRODUCING PATTERNED FOAM RUBBER COATED FABRICS

Whitworth F. Bird, Riverside, Conn., assignor to Collins & Aikman Corporation, Philadelphia, Pa., a corporation of Delaware Application July 18, 1956, Serial No. 598,610

9 Claims. (Cl. 18—4)

This invention relates to methods and apparatus for producing patterned foam coated fabrics, that is to say to fabrics in which a foam coating of latex, vinyl, polyurethane or the like bonded to woven knitted or other kinds of base material is ornamentally configured.

The chief aim of my invention is to provide a simple method and a reliable apparatus by which ornamented foam covered fabrics of the kind referred to can be continuously produced economically and expeditiously with the ornamentation clearly and sharply defined.

Other objects and attendant advantages will appear from the following detailed description of the attached drawings, wherein:

Fig. 1 is a view, more or less diagrammatically represented, of an apparatus for producing patterned foam coated fabric in accordance with my invention.

Fig. 2 is a detail cross sectional view of the apparatus taken as indicated by the angled arrows II—II in Fig. 1.

Fig. 3 is a fragmentary detail view taken as indicated by the angled arrows III—III in Fig. 2 and drawn to a larger scale.

Fig. 4 shows a fragment of ornamented fabric such as may be produced by the apparatus.

Fig. 5 shows a sectional view of the fabric taken as indicated by the angled arrows V—V in Fig. 4.

Fig. 6 is a view corresponding to Fig. 2 showing a modification.

Fig. 7 is a detail sectional view taken as indicated by the angled arrows VII—VII in Fig. 6.

Fig. 8 is a view corresponding to Fig. 5 in cross section, of ornamented fabric produced in accordance with the modification shown in Figs. 6 and 7.

Fig. 9 is a view similar to Fig. 1 showing an alternative embodiment of the apparatus.

Fig. 10 is a fragmentary view drawn to a larger scale and showing a portion of the apparatus of Fig. 9 in section.

Fig. 11 is a fragmentary view of ornamented fabric produced in the apparatus of Figs. 9 and 10, and Fig. 12 shows the fabric of Fig. 11 in cross section.

With reference first more particularly to Figs. 1–3 of these illustrations, the apparatus there shown comprises a drum 1 which is arranged to be rotated in the direction of the arrow thereon in Fig. 1, through a belt or sprocket chain connection 2, by an electric gear motor conventionally indicated at 3. The drum 1 has hollow trunnions 4 for circulation therethrough of steam or other heating medium, the trunnions being journalled in suitably-supported fixed bearings such as the one designated 5. Indented or otherwise formed in the cylindrical surface of the drum 1 are design figures which are to be reproduced in the foam facing of the fabric as later explained, the indentations 6 being exemplified, in the present instance, as being of diamond configuration. Continuous base material M, which may be woven, knitted or otherwise prepared, intended to serve as the foundation for the fabric, is advanced from a source of supply (not illustrated) over guide rolls 7 and 8 to approach the drum 1 at a tangent and to pass downwardly of one side of the drum. After rounding the drum 1 at the bottom and passing upwardly of the opposite side thereof, the base material is directed, for horizontal travel, over another guide roll 9. Disposed in the tapering interval at the region of tangential approach of the material M to the drum 1 and shaped to correspond with said interval, is a spout 10 through which the foam in liquid form, designated L is discharged onto the surface of the drum. By the action of the roll 8 upon the back of the base material M, the foam is squeezed into the indentations 6 of the drum as the latter turns.

To the right of the drum 1 is an after treating chamber 11 which is traversed by the upper run of a horizontally-arranged endless apron conveyor 12 trained about end pulleys 13 and 14. By means of sprocket chain connection 15, the pulley 14 is driven from the motor 3 for impartation, to the apron 12, of a surface speed corresponding substantially to that of the drum 1. As shown, the guide roll 9 is positively driven, through a sprocket chain connection 16 from the shaft of the pulley 13, likewise at a surface speed equal substantially to that of the drum.

Due to heating of the drum 1, the foam in the depressions 6 is partially set and thereby sufficiently solidified by the time the roller 9 is reached, for adhesion to the base material M and withdrawal from the depressions as the fabric is advanced by the conveyer 12 through the chamber 11 for final treatment of the foam as may be required. At 17 there is conventionally shown a means for maintaining the base material M under sufficient tension to cause it to hug the surface of the drum 1 enroute from the roller 8 to the roller 9. As illustrated in Figs. 4 and 5, the product resulting from the operation of the apparatus as above constructed, is characterized by uniformly-spaced design figures 18 of foam projecting upwardly from the base material M.

If found necessary or desirable, the drum may be additionally heated to hasten the setting of the liquid foam deposited in the recesses 6, by means of a hollow jacket 19 through which steam or other fluent heating medium is circulated, said jacket extending about the portion of the drum contacted by the base material M.

In the modification of Figs. 6 and 7, the drum 1 is provided, at opposite sides, with circumferential rim flanges 20 which extend beyond the indented surface of the drum and by which the base material M is held spaced somewhat from said surface as it passes about the drum. As a consequence, it will be seen that a layer 21 of foam will be deposited upon the surface of the base material M with the design figures 18 projecting therefrom.

In the alternative apparatus illustrated in Figs. 9 and 10, the drum 1a is identical with the drum 1 of the first described embodiment except in that its surface depressions or indentations 6a (Fig. 10) are circular and staggeringly disposed in relation to each other. In this instance, the base material M is directed, by an inclined guide plate 7a, to approach the drum 1 at a tangent so as to underpass the drum; and the apron conveyer 12 is arranged below the drum with its top run, upon which the material is advanced, spaced somewhat from the drum surface. Here, as in the first described embodiment, the chute 10a, by which the liquid foam L is delivered, is disposed in the tapered interval in the region of tangential approach of the base material to the drum. After leaving the drum 1a, the ornamented fabric is passed by the conveyer 12a through the after treating chamber indicated at 11a. The product, shown in Figs. 11 and 12, of the alternative apparatus is similar to that shown in Fig. 8 except for having, instead of diamond-shaped design projections, staggeringly arranged rounded projections 18a outstanding from a layer 21a of the foam on the base material M.

It is to be understood that I do not consider myself limited to the fabric designs herein illustrated by way of example since, as will be readily understood, the surface of the drum used in either apparatus can be indented to predetermined formation, from the foam, of various other ornamental configurations within the scope of the appended claims.

Having thus described my invention, I claim:

1. A method of producing pattern latex foam covered fabric which comprises the steps of passing base material in continuous sheet form partway about a heated rotary drum having design indentations in its cylindrical surface; feeding ungelled latex foam between the drum and the base material in the region of tangential approach of the material to the drum; drawing the finished fabric from the drum after it has passed partway about the drum to gell the latex foam; and finally advancing the fabric through an after treating chamber to cure and vulcanize the latex.

2. A method of producing pattern latex foam covered fabric which comprises the steps of passing the base material in continuous sheet form partway about a heated rotary drum having design indentations in its cylindrical surface while maintaining the base material spaced somewhat from said surface; feeding ungelled latex foam between the drum and the base material in the region of tangential approach of the material to the drum, drawing the finished material from the drum after having passed partway about the drum to gell the latex foam, and finally advancing the fabric through an after treating chamber to cure and vulcanize the latex.

3. In apparatus for producing patterned latex foam coated fabric, a driven heated rotary drum having a designed pattern cut or otherwise formed in its cylindrical surface; means for guiding the base material in sheet form to approach the drum at a tangent; means for feeding ungelled latex foam between the drum and the base fabric in the region of tangential approach of the fabric to the drum; an after treating chamber; and means for drawing the finished fabric from the drum after having passed partway about the drum to gell the latex foam and advancing the fabric through after treating chamber to cure and vulcanize the latex.

4. The invention according to claim 3, further including means for maintaining the base material under a definite degree of tension as it passes about the drum.

5. The invention according to claim 3, further including means for heating the drum from within, and a heating means extending with intervening clearance, about the portion of the drum rounded by the base material to set the foam before the base material with the applied ornamentation leaves the drum.

6. The invention according to claim 3, wherein the drum is provided, at opposite ends, with relatively narrow circumferential rim flanges which extend somewhat beyond the patterned surface of the drum, as and for the purpose set forth.

7. The invention according to claim 3, further including means for driving the drum and the advancing means at substantially the same surface speed.

8. The invention according to claim 3, wherein the guide means comprises a roll for diverting the base material from a horizontal path to approach the drum at a tangent from above for passage downward of one side of the drum and about the bottom thereof, and another roll for causing the base material to pass upward of the other side of the drum and for diverting it, with the applied foam ornamentation, to horizontal travel enroute to the after treating chamber for final treatment.

9. The invention according to claim 3, wherein the guide means comprises a plate for causing the base material to tangentially approach the drum at a downward angle for passage about the bottom of the drum; and wherein the advancing means is in the form of an endless conveyer belt which under-travels the drum.

References Cited in the file of this patent

UNITED STATES PATENTS

| | | |
|---|---|---|
| 80,809 | Cobb et al. | Aug. 11, 1868 |
| 1,469,875 | Beauregard | Oct. 9, 1923 |
| 1,503,665 | Roberts | Aug. 5, 1924 |
| 2,072,597 | Keen et al. | Mar. 2, 1937 |
| 2,167,388 | Kremmling | July 25, 1939 |
| 2,246,987 | Roos | June 24, 1941 |